(12) United States Patent  (10) Patent No.: US 7,551,131 B2
Jin  (45) Date of Patent: Jun. 23, 2009

(54) WIRELESS COMMUNICATION DEVICE AND ASSOCIATED METHOD INCLUDING CONTROL OF POSITIONING-SYSTEM RECEIVER AND SHARED OSCILLATOR

(75) Inventor: Xin Jin, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 113 days.

(21) Appl. No.: 11/695,111

(22) Filed: Apr. 2, 2007

(65) Prior Publication Data

US 2007/0241956 A1 Oct. 18, 2007

Related U.S. Application Data

(60) Provisional application No. 60/789,813, filed on Apr. 6, 2006.

(51) Int. Cl.
  *G01S 5/14* (2006.01)
(52) U.S. Cl. .................................. 342/357.1
(58) Field of Classification Search ............... 342/357.1
  See application file for complete search history.

(56) References Cited

U.S. PATENT DOCUMENTS 6,009,118 A * 12/1999 Tiemann et al. ............. 375/150
6,041,222 A * 3/2000 Horton et al. ............... 455/255
6,122,506 A 9/2000 Lau et al. .................... 455/427
6,965,754 B2 11/2005 King ......................... 455/12.1
7,062,240 B2 * 6/2006 Ballantyne et al. ........ 455/182.1
7,155,183 B2 * 12/2006 Abraham .................. 455/192.1
2004/0102165 A1 5/2004 Bloebaum et al. ........... 455/141
2004/0132421 A1 7/2004 Underbrink .................. 455/255

* cited by examiner

*Primary Examiner*—Gregory C Issing
(74) *Attorney, Agent, or Firm*—Allen, Dyer, Doppelt, Milbrath & Gilchrist, P.A.

(57) ABSTRACT

The wireless communication device includes a wireless communication transceiver to generate an oscillator control signal and an activation signal, a positioning-system receiver (e.g. a GPS receiver) to process received positioning signals, and a shared oscillator (e.g. a temperature compensated and voltage controlled crystal oscillator TCVCXO) responsive to the oscillator control signal and to generate a reference frequency signal for the wireless communication transceiver and the positioning-system receiver. The positioning-system receiver may control processing of the received positioning signals based upon the activation signal to reduce a noise contribution (e.g. phase noise) due to frequency control of the shared oscillator based upon the oscillator control signal. The activation signal may indicate that the oscillator control signal is being varied to provide frequency control or adjustment of the shared oscillator.

19 Claims, 3 Drawing Sheets

WIRELESS COMMUNICATION DEVICE AND ASSOCIATED METHOD INCLUDING CONTROL OF POSITIONING-SYSTEM RECEIVER AND SHARED OSCILLATOR

RELATED APPLICATION

This application is based upon provisional application Ser. No. 60/789,813 filed Apr. 6, 2006, the entire subject matter of which is incorporated herein by reference in its entirety.

FIELD OF TECHNOLOGY

The present invention relates to the field of communications, and, more particularly, to handheld wireless communications, location determination and related methods.

BACKGROUND

A Global Positioning System (GPS) receiver may be implemented in a handheld wireless communication device, such as a cellular phone. For example, United States Patent Application 2006/0250302 to Park et al. entitled "Apparatus and method for receiving GPS signals in a mobile terminal" is directed to an apparatus and method for increasing GPS reception sensitivity in a mobile terminal having a mobile-based GPS positioning function. A GPS receiver in the mobile terminal receives sensitivity assistance (SA) data by using basic information about GPS satellites and system time. The GPS receiver then correlates a PRN code with a GPS signal and coherent-integration of the correlation result by using the SA data. It calculates a position of the mobile terminal by using the integrated samples.

In the Enhanced 911 (E911) program, the GPS should be able to determine the location of the cellular phone even when a user makes emergency calls in an indoor environment, where the GPS receiver does not have view of the sky. High sensitivity is required for such an application, such as −155 dBm or higher.

United States Patent Application 2004/0102165 to Bloebaum et al. entitled "Compensation for frequency adjustment in mobile communication-positioning device with shared oscillator" discloses a method for compensating for a frequency adjustment in an oscillator shared between a communication circuit and a positioning signal receiver. In one embodiment, the method begins to receive and store a positioning signal at a first time point. When, at a second time point, the operating frequency of the shared oscillator is adjusted, the frequency adjustment is recorded. After the positioning signal is completely received and stored, the processing of the positioning signal takes into consideration the frequency adjustment. In that embodiment, the processing hypothesizes a frequency shift in the received positioning signal. In another embodiment, the method for determining the operating frequency of the oscillator detects a beginning time point of a reference signal received by the mobile communication device and enables a counter to count in step with a clock signal derived from the oscillator. When an ending time point of the reference signal is received by the mobile communication device, the count is stopped, and the frequency of the oscillator is determined based on the count in the counter and an expected time that elapsed between the beginning time point and the ending time point.

Achieving high sensitivity, a GPS receiver will try to correlate the local pseudo noise (PN) with the received signal using longest possible coherent correlation length. Coherent correlation length is limited by the phase noise of the frequency and time reference of the GPS receiver, which is usually implemented as a TCVCXO (temperature compensated and voltage controlled crystal oscillator). A low phase noise GPS TCVCXO may be critical to sensitivity performance.

The cellular transceiver usually also has a TCVCXO, that is controlled by an AFC (automatic frequency control) loop. The loop continually adjusts the control voltage of the cellular TCVCXO to maintain low frequency error that meets requirements of the cellular transceiver.

When the GPS receiver and the cellular transceiver share a single TCVCXO, the conventional AFC loop will usually make the phase noise of the TCVCXO too high for use of the GPS receiver, causing loss of UPS sensitivity.

DETAILED DESCRIPTION OF THE PREFERRED EMBODIMENTS

Figure 1:
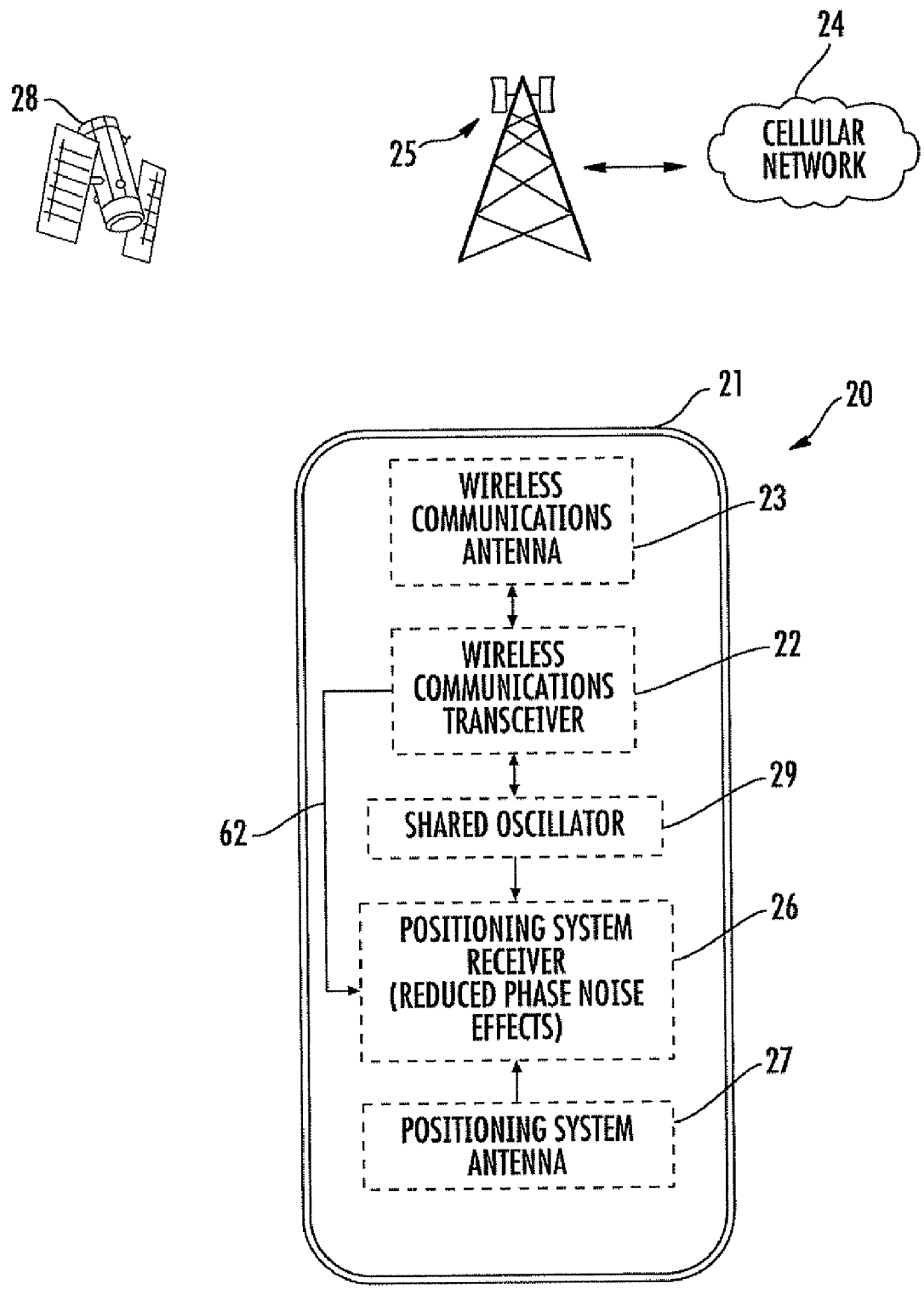
FIG. 1 is a schematic diagram illustrating a wireless communication device in accordance with an example of an embodiment of the present invention.

In view of the foregoing background, it is therefore an object of the present invention to provide an approach to reduce and/or eliminate the phase noise contribution in the control of the positioning-system receiver due to frequency adjustment of the shared oscillator.

This and other objects, features, and advantages in accordance with the present embodiments are provided by a wireless communication device including a wireless communication transceiver to generate an oscillator control signal and an activation signal, a positioning-system receiver (e.g. a GPS receiver) to process received positioning signals, and a shared oscillator (e.g. a temperature compensated and voltage controlled crystal oscillator TCVCXO) responsive to the oscillator control signal and to generate a reference frequency signal for the wireless communication transceiver and the positioning-system receiver. The positioning-system receiver may control processing of the received positioning signals based upon the activation signal to reduce a noise contribution (e.g. phase noise) due to frequency control of the shared oscillator based upon the oscillator control signal. The activation signal may indicate that the oscillator control signal is being varied to provide frequency control or adjustment of the shared oscillator.

The wireless communication transceiver may include an automatic frequency control (AFC) module to generate the oscillator control signal and the activation signal. Also, a first frequency synthesizer may provide clock signals to the AFC module based upon the reference frequency signal. The positioning-system receiver may include a second frequency synthesizer to provide clock signals for the positioning-system receiver based upon the reference frequency signal. A controller may control processing of the received positioning signals based upon the activation signal from the AFC module.

The positioning-system receiver may further include a coherent correlator to correlate locally generated pseudo noise with the received positioning signals, a non-coherent combiner to non-coherently combine correlation results from the coherent correlator, and a pseudo-range calculator to calculate pseudo-ranges based upon non-coherently combined correlation results from the non-coherent combiner. The controller may provide control signals to the coherent correlator and the non-coherent combiner based upon the activation signal from the AFC module.

The wireless communication transceiver may include a first down converter to down convert received communication signals, an automatic frequency control (AFC) module connected downstream from the down converter and generating the oscillator control signal and the activation signal, a digital-to-analog converter (DAC) receiving the oscillator control signal from the AFC module, and a first frequency synthesizer to provide clock signals to at least the first down converter and AFC module based upon the reference frequency signal. Also, the positioning-system receiver may include a second down converter to down convert received positioning signals, a coherent correlator downstream from the second down converter to correlate locally generated pseudo noise with the received positioning signals, a non-coherent combiner to non-coherently combine correlation results from the coherent correlator, a pseudo-range calculator to calculate pseudo-ranges based upon non-coherently combined correlation results from the non-coherent combiner, a second frequency synthesizer to provide clock signals to at least the second down converter based upon the reference frequency signal, and a controller to provide control signals to the coherent correlator and the non-coherent combiner based upon the activation signal from the AFC module.

A method aspect is directed to operating a wireless communication device including generating an oscillator control signal and an activation signal with a wireless communication transceiver, processing received positioning signals with a positioning-system receiver, and generating a reference frequency signal for the wireless communication transceiver and the positioning-system receiver with a shared oscillator responsive to the oscillator control signal. The method includes controlling processing of the received positioning signals at the positioning-system receiver based upon the activation signal to reduce a noise contribution due to frequency control of the shared oscillator.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present method and apparatus is for controlling a positioning-system (e.g. GPS) receiver and a shared oscillator (e.g. TCVCXO) shared by the GPS receiver and a cellular transceiver to effectively relax the phase noise requirement without significant loss of GPS sensitivity, and still meeting the frequency accuracy requirements of the cellular network.

Figure 2:
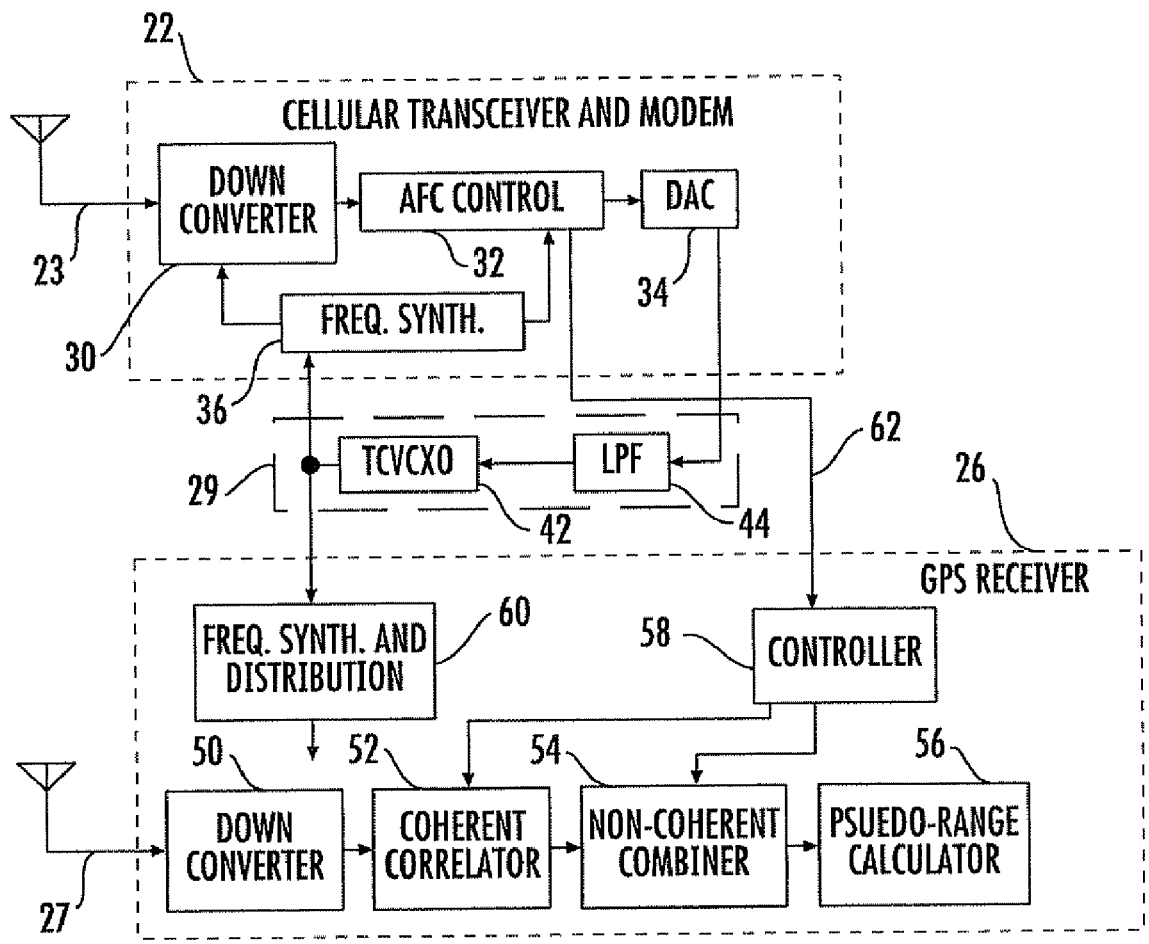
FIG. 2 is a schematic block diagram illustrating various details of an example of an embodiment of the wireless communication device of FIG. 1.

Referring initially to FIGS. 1 and 2, a mobile wireless communications device 20 and associated method of operating in accordance with the present invention will now be described. The device 20 illustratively includes a portable housing 21 and one or more wireless transceivers 22 (e.g. a cellular transceiver) carried by the portable housing. In the example illustrated in FIG. 1, a cellular transceiver 22 cooperates with a cellular antenna 23 to communicate over a cellular network 24 via a base station(s) 25, which is shown as a cell tower for clarity of illustration. In other embodiments, the wireless transceiver 22 be a wireless local or personal area network (LAN/PAN) transceiver for communicating via a wireless LAN/PAN, for example. In still further embodiments, both cellular and wireless LAN/PAN transceivers may be included, as will be appreciated by those skilled in the art.

The device 20 further illustratively includes a satellite positioning signal receiver 26 carried by the portable housing 21. By way of example, the satellite positioning signal receiver 26 may be a GPS receiver, although receivers compatible with other satellite positioning systems such as Galileo, for example, may also be used. An antenna 27 is also carried by the portable housing 21 and is connected to the satellite positioning signal receiver 26 for receiving positioning signals from GPS satellites 28, as will be appreciated by those skilled in the art. It should be noted that in some embodiments the antenna 27 may also be connected to the wireless transceiver (s) 22 and used for communicating over a wireless network(s) as well, as will be appreciated by those skilled in the art.

A shared oscillator 29 provides reference signals to each of the wireless communications transceiver 23 and the positioning-system receiver 26 as will be appreciated by those skilled in the art.

Referring more specifically to an example of an embodiment as illustrated in FIG. 2, the simplified block diagram does not attempt to show all components but only selected components that are closely related to the invention. Those skilled in the art can recognize that the transmitter is omitted, for example; and in the receiver, not all components are shown, such as amplifiers, filters, A/D converter, etc. In the cellular transceiver and modem 22, there is a down converter that converts the received signal from antenna 23 to lower frequencies (intermediate frequency (IF) and/or baseband). An AFC control processing module 32 compares the received signal frequency with a locally generated frequency and produces a control or adjustment signal to be sent to DAC (digital to analog converter) 34, the analog version of the control signal is smoothed by a LPF 44 (low pass filter) to control the frequency of the TCVCXO 42 of the shared oscillator 29.

The local oscillator frequency provided to the down converter 30, the AFC control module 32 and other clock frequencies (such as sampling frequency, not shown) may be generated by frequency synthesizer module 36 that may typically include PLLs (phase locked loop) based on the reference frequency signal produced by the TCVCXO 42. The control signal (output of LPF 44) is provided into the TCVCXO 42 from time to time to trim the oscillating frequency of the TCVCXO to maintain the desired frequency accuracy. Since the frequency is continually adjusted, the adjustments effectively add additional phase noise to the TCVCXO, and under certain conditions, it may be the dominating contributor to the phase noise of the TCVCXO.

The GPS receiver 26 receives GPS signals from GPS antenna 27. The GPS receiver 26 also has a down converter 50 that translates the received signal to a lower frequency, IF and/or baseband. The down converter 50 makes use of a local oscillator signal obtained from a frequency synthesizer 60 to accomplish the frequency translation. The frequency synthesizer 60 also produces other clock signals distributed to other various components in the GPS receiver 26. The frequency synthesizer 60 is based on the reference frequency signal produced by the TCVCXO 42 to produce the needed frequency signals.

The phase noise, including that contributed by the AFC loop on the cellular transceiver and modem 22, will be translated to the output signals, that may degrade GPS receiver sensitivity. In the GPS receiver 26, there may be a coherent correlator 52, receiving signals from down converter 50 (details such as amplifiers, filters, A/D are omitted for ease of explanation) that correlates a locally generated PN (pseudo noise) with the received GPS signals at various hypothesis time delays on a given frequency bin (or referred to as Doppler bin). Within the length of the correlation, the correlation results are "voltage-added", i.e., coherently combined. If there exists phase noise in the down conversion processing, the results may or may not add up constructively, depending on the phase of the down-converted signal at the time instants that is affected by the phase noise of the TCVCXO.

The coherent correlation results are then further non-coherently combined at a non-coherent combiner 54, and the pseudo-range is calculated by the pseudo range calculator 56. Non-coherent combining is a combination operation that does not involve the phase of the signals, such as combining in power, in energy or in magnitude, etc.

In addition to how a conventional AFC control operates, the AFC control module 32 further produces an activation signal 62 that signals the controller 58 for the GPS receiver. The signal 62 is activated before the AFC control module 32 varies its TCVCXO control output value, and deactivated after the AFC control module 32 finishes updating the its TCVCXO control output value, and the frequency of the TCVCXO 42 settles. During the period the signal 62 is deactivated, the AFC control module 32 holds a constant value for the TCVCXO control signal. In other words, the phase noise contribution caused by AFC adjustment only exists when signal 62 is activated and does not exist when signal 62 is deactivated.

The controller 58 further controls the coherent correlator 52 such that, in a high sensitivity mode of the GPS receiver operation, the coherent correlation begins and ends only during the period while the signal 62 is deactivated and preferably does not cross over any portion of the activated period of signal 62. The controller 58 also controls the non-coherent combiner 54 such that the correlation results obtained before an activation period of signal 62 and after the deactivation of the signal 62 following the activation period will be combined only non-coherently, if any combining will happen, in a high sensitivity mode of the GPS receiver operation. During activation of signal 62, it is preferred that no correlation of the signal is performed or its results are used for calculation of pseudo-range calculations for high sensitivity mode of operation.

It may be further desirable to estimate the down-converted GPS signal frequency difference before and after the AFC adjustment, so that the correlation results before and after the adjustment are combined with the appropriate frequency bins according to the frequency change made by the AFC adjustment. Note that in low sensitivity mode of operation, the above restrictions may not have to be applied, because performance of low sensitivity operation mode may not be significantly affected by the phase noise contribution of AFC adjustment.

The signal 62 may be further combined with one or a plurality of signals that indicate the activation of wireless transmitters (such as a cellular transmitter, a WLAN transmitter, etc., residing in the wireless handheld device, not shown in drawing) and the combined signal may be used to accomplish the above control tasks on the GPS receiver operation. When the signals are active HIGH, the combining of the two (or more) signals may be logically OR-ed, for example.

Accordingly, the GPS receiver 26 may control processing of the received positioning signals based upon the activation signal 62 to reduce a noise contribution (e.g. phase noise) due to frequency control of the shared oscillator 29 based upon the oscillator control signal. As such, the activation signal 62 may indicate that the oscillator control signal is being varied to provide frequency control or adjustment of the shared oscillator 29.

A method aspect is directed to operating the wireless communication device 20 including generating an oscillator control signal and an activation signal with a wireless communication transceiver 22, processing received positioning signals with a positioning-system receiver 26, and generating a reference frequency signal for the wireless communication transceiver and the positioning-system receiver with a shared oscillator 29 responsive to the oscillator control signal. The method includes controlling processing of the received positioning signals at the positioning-system receiver 26 based upon the activation signal to reduce a noise contribution due to frequency control of the shared oscillator 29.

In the method, generating the oscillator control signal and the activation signal may include generating the oscillator control signal and the activation signal with an automatic frequency control (AFC) module 32 of the wireless communication transceiver 22, and may further include providing clock signals to the AFC module from the first frequency synthesizer 36 of the wireless communication transceiver based upon the reference frequency signal. Also, processing received positioning signals with the positioning-system receiver 26 may include providing clock signals from a second frequency synthesizer 60 for the positioning-system receiver based upon the reference frequency signal, and controlling processing of the received positioning signals with a controller 58 of the positioning-system receiver based upon the activation signal from the AFC module 32.

Processing received positioning signals with the positioning-system receiver 26 may further include correlating locally generated pseudo noise with the received positioning signals via a coherent correlator 52, non-coherently combining correlation results from the coherent correlator via a non-coherent combiner 54 and calculating pseudo-ranges with a pseudo-range calculator 56 based upon non-coherently combined correlation results from the non-coherent combiner. Control signals may be provided to the coherent correlator 52 and the non-coherent combiner 54 from the controller 58 based upon the activation signal from the AFC module 32.

Accordingly, the present method and apparatus provides for the control of the positioning-system (e.g. GPS) receiver 26 and the shared oscillator 29 (e.g. TCVCXO) shared by the GPS receiver and a cellular transceiver 22 to effectively relax the phase noise requirement without significant loss of GPS sensitivity, while still meeting the frequency accuracy requirements of the cellular network.

One example of a hand-held mobile wireless communications device 1000 that may be used is further described in the example below with reference to FIG. 3. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 3:
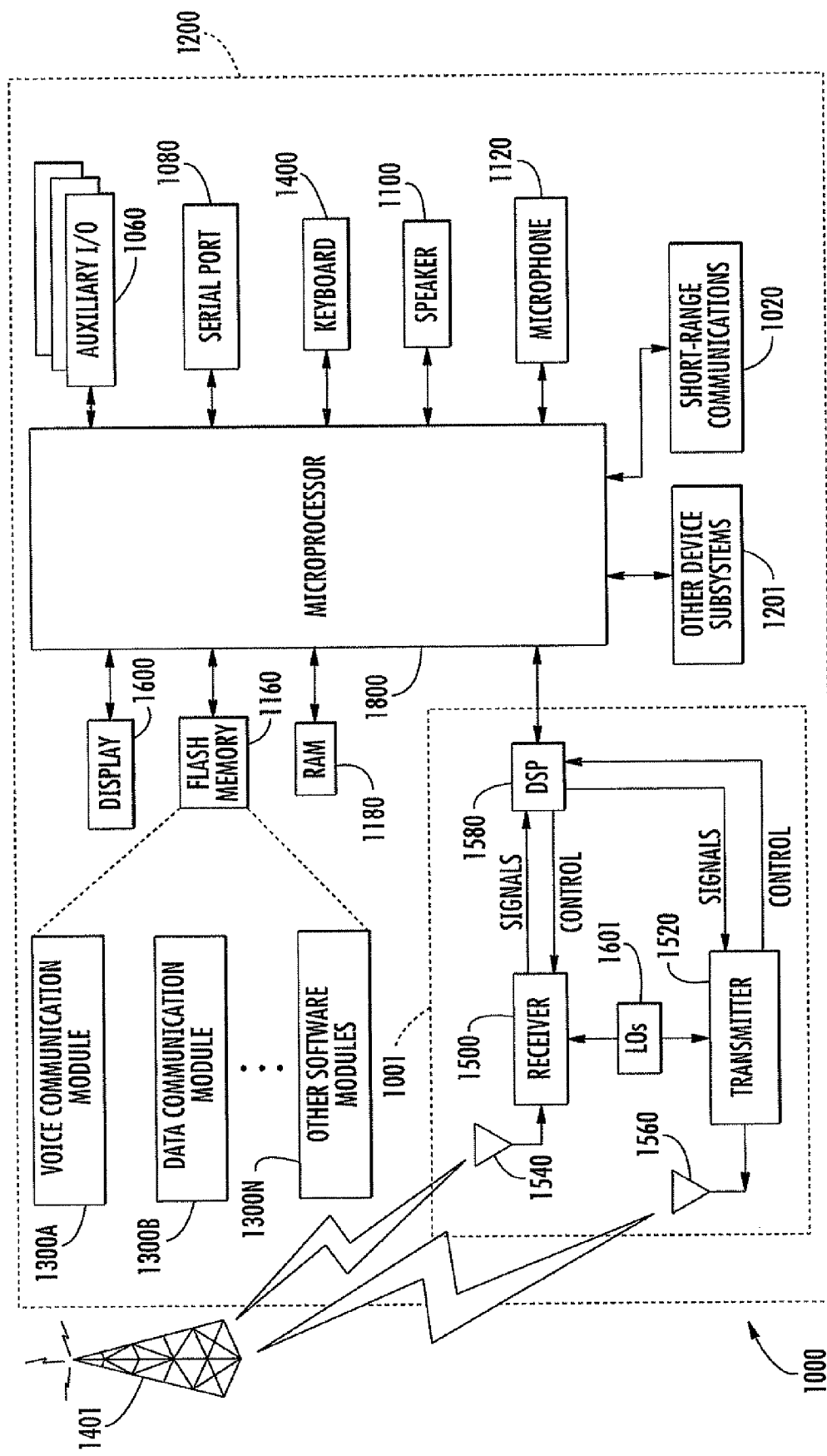
FIG. 3 is a schematic block diagram illustrating exemplary components of a mobile wireless communications device in accordance with the present invention.

In addition to the processing device 1800, other parts of the mobile device 1000 are shown schematically in FIG. 3. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system. Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communication device comprising:
a wireless communication transceiver to generate an oscillator control signal and an activation signal;

a positioning-system receiver to process received positioning signals; and a shared oscillator responsive to the oscillator control signal and to generate a reference frequency signal for the wireless communication transceiver and the positioning-system receiver;

said positioning-system receiver to control processing of the received positioning signals based upon the activation signal to reduce a noise contribution due to frequency control of the shared oscillator based upon the oscillator control signal;

wherein the wireless communication transceiver includes an automatic frequency control (AFC) module to generate the oscillator control signal and the activation signal, and a first frequency synthesizer to provide clock signals to the AFC module based u on the reference frequency signal.

2. The wireless communication device of claim 1 wherein the positioning-system receiver includes:

a second frequency synthesizer to provide clock signals for the positioning-system receiver based upon the reference frequency signal; and a controller to control processing of the received positioning signals based upon the activation signal from the AFC module.

3. The wireless communication device of claim 2 wherein the positioning-system receiver further includes:

a coherent correlator to correlate locally generated pseudo noise with the received positioning signals;

a non-coherent combiner to non-coherently combine correlation results from the coherent correlator; and a pseudo-range calculator to calculate pseudo-ranges based upon non-coherently combined correlation results from the non-coherent combiner;

the controller providing control signals to the coherent correlator and the noncoherent combiner based upon the activation signal from the AFC module.

4. The wireless communication device of claim 1 wherein the positioning-system receiver comprises a global positioning system (GPS) receiver.

5. The wireless communication device of claim 1 wherein the wireless communication transceiver includes a first down converter to down convert received communication signals, the automatic frequency control (AFC) module connected downstream from the down converter and generating the oscillator control signal and the activation signal, a digital-to-analog converter (DAC) receiving the oscillator control signal from the AFC module, and the first frequency synthesizer to provide clock signals to at least the first down converter and AFC module based upon the reference frequency signal; and wherein the positioning-system receiver includes a second down converter to down convert received positioning signals, a coherent correlator downstream from the second down converter to correlate locally generated pseudo noise with the received positioning signals, a non-coherent combiner to non-coherently combine correlation results from the coherent correlator, a pseudo-range calculator to calculate pseudo-ranges based upon non-coherently combined correlation results from the non-coherent combiner, and a second frequency synthesizer to provide clock signals to at least the second down converter based upon the reference frequency signal, and a controller to provide control signals to the coherent correlator and the noncoherent combiner based upon the activation signal from the AFC module.

6. The wireless communication device of claim 1 wherein the activation signal indicates that the oscillator control signal is being varied to provide frequency control of the shared oscillator.

7. The wireless communication device of claim 1 wherein the shared oscillator comprises a temperature compensated and voltage controlled crystal oscillator (TCVCXO)

8. A wireless communication device comprising:

a wireless communication transceiver including an automatic frequency control (AFC) module generating an oscillator control signal and an activation signal, and a first frequency synthesizer to provide clock signals to the AFC module based upon a reference frequency signal;

a satellite positioning-system receiver including a second frequency synthesizer to provide clock signals for the satellite positioning-system receiver based upon the reference frequency signal, and a controller to control processing of received positioning signals based upon the activation signal from the AFC module; and a shared local oscillator to receive the oscillator control signal and to generate the reference frequency signal for the first and second frequency synthesizers.

9. The wireless communication device of claim 8 wherein the satellite positioning-system receiver further includes:

a coherent correlator to correlate locally generated pseudo noise with the received positioning signals;

a non-coherent combiner to non-coherently combine correlation results from the coherent correlator; and a pseudo-range calculator to calculate pseudo-ranges based upon non-coherently combined correlation results from the non-coherent combiner;

the controller providing control signals to the coherent correlator and the non-coherent combiner based upon the activation signal from the AFC module.

10. The wireless communication device of claim 8 wherein the satellite positioning-system receiver comprises a global positioning system (GPS) receiver.

11. The wireless communication device of claim 8 wherein the controller controls processing of the received positioning signals based upon the activation signal to eliminate a noise contribution due to frequency control of the shared oscillator based upon the oscillator control signal.

12. The wireless communication device of claim 11 wherein the activation signal indicates that the oscillator control signal is being varied to provide frequency control of the shared oscillator.

13. A method of operating a wireless communication device comprising:

generating an oscillator control signal and an activation signal with a wireless communication transceiver;

processing received positioning signals with a positioning-system receiver;

generating a reference frequency signal for the wireless communication transceiver and the positioning-system receiver with a shared oscillator responsive to the oscillator control signal; and controlling processing of the received positioning signals at the positioning-system receiver based upon the activation signal to reduce a noise contribution due to frequency control of the shared oscillator;

wherein generating the oscillator control signal and the activation signal comprises generating the oscillator control signal and the activation signal with an automatic frequency control (AFC) module of the wireless communication transceiver; and further comprising providing clock signals to the AFC module from a first frequency synthesizer of the wireless communication transceiver based upon the reference frequency signal.

14. The method of claim 13 wherein processing received positioning signals with the positioning-system receiver includes:
  providing clock signals from a second frequency synthesizer for the positioning-system receiver based upon the reference frequency signal; and
  controlling processing of the received positioning signals with a controller of the positioning-system receiver based upon the activation signal from the AFC module.

15. The method of claim 14 wherein processing received positioning signals with the positioning-system receiver further includes:
  correlating locally generated pseudo noise with the received positioning signals via a coherent correlator;
  non-coherently combining correlation results from the coherent correlator via a non-coherent combiner; and
  calculating pseudo-ranges with a pseudo-range calculator based upon non-coherently combined correlation results from the non-coherent combiner;
  providing control signals to the coherent correlator and the non-coherent combiner from the controller based upon the activation signal from the AFC module.

16. The method of claim 13 wherein processing received positioning signals with the positioning-system receiver comprises processing received positioning signals with a global positioning system (GPS) receiver.

17. The method of claim 13 wherein generating the oscillator control signal and the activation signal comprises:
  down converting received communication signals in a first down converter;
  generating the oscillator control signal and the activation signal with the automatic frequency control (AFC) module;
  performing a digital-to-analog conversion of the oscillator control signal from the AFC module; and
  providing clock signals to at least the first down converter and AFC module with the first frequency synthesizer based upon the reference frequency signal.

18. The method of claim 17 wherein processing received positioning signals with the positioning-system receiver includes:
  down converting received positioning signals with a second down converter;
  correlating locally generated pseudo noise with the received positioning signals via a coherent correlator downstream from the second down converter;
  non-coherently combining correlation results from the coherent correlator with a non-coherent combiner;
  calculating pseudo-ranges with a pseudo-range calculator based upon non-coherently combined correlation results from the non-coherent combiner;
  providing clock signals with a second frequency synthesizer to at least the second down converter based upon the reference frequency signal; and
  providing control signals from a controller to the coherent correlator and the non-coherent combiner based upon the activation signal from the AFC module.

19. The method of claim 13 wherein the activation signal indicates that the oscillator control signal is being varied to provide frequency control of the shared oscillator.

* * * * *

UNITED STATES PATENT AND TRADEMARK OFFICE
CERTIFICATE OF CORRECTION

PATENT NO.         : 7,551,131 B2             Page 1 of 1
APPLICATION NO. : 11/695111
DATED              : June 23, 2009
INVENTOR(S)        : Jin It is certified that error appears in the above-identified patent and that said Letters Patent is hereby corrected as shown below:

Column 9, Line 16 Claim 1          Delete: "u on"
                                   Insert: --upon--

Signed and Sealed this

Eighteenth Day of August, 2009

David J. Kappos
*Director of the United States Patent and Trademark Office*